Patented Dec. 12, 1933

1,938,976

UNITED STATES PATENT OFFICE 1,938,976

POLYAZO DYESTUFFS

Ralph B. Payne, Elma, N. Y., assignor to National Aniline & Chemical Company, Inc., New York, N. Y., a corporation of New York No Drawing. Application July 12, 1929
Serial No. 377,913

18 Claims. (Cl. 260—70)

This invention relates to polyazo dyestuffs and to a process for the production of such dyestuffs, and includes correlated improvements and discoveries whereby and wherewith the production and properties of polyazo dyestuffs are enhanced.

An object of the invention is to provide a process for the production of polyazo dyestuffs which may be practiced economically on a commercial scale.

Another object of the invention is to provide polyazo dyestuffs which have the property of dyeing cotton and other vegetable fibres violet to blue shades and which may be used either as a direct dye or as a developed dye.

Further objects of the invention are to provide polyazo dyestuffs suitable for application to cotton and other vegetable fibres giving violet to blue shades which exhibit good fastness to light, to washing, and to cross dyeing and which may be discharged by reducing agents to a white, and to provide as a part of the invention a material which is dyed or printed with the new polyazo dyestuffs.

Other objects of the invention will in part be obvious and will in part appear hereinafter.

The invention accordingly comprises the several steps and the relation and order of one or more of such steps with respect to each of the others, and the product possessing the features, properties, and the relation of constituents, which are exemplified in the following detailed disclosure, and the scope of the application of which will be indicated in the claims.

The new polyazo dyestuffs of the present invention can be obtained by coupling two molecular proportions of a diazotized acyl-diamine of the benzene series which is free from a hydroxyl group and may contain other groups with one molecular proportion of a tetrakisazo dye derivable by combining one molecular proportion of an I-acid compound such as 5.5′-dihydroxy-2.2′-dinaphthylamine - 7.7′ - disulfonic acid (I - acid imide) or 5.5′-dihydroxy-2.2′-dinaphthylurea-7.7′-disulfonic acid (I-acid urea) with two molecular proportions of a diazotized aminoazo compound, or by coupling one molecular proportion of each of two different diazotized aminoazo compounds, obtainable by coupling one molecular proportion of diazotized H-acid (i. e., 1.8-amino-naphthol-3.6-disulfonic acid) with one molecular proportion of an aromatic amine, as an amine of the benzene or the naphthalene series, which is free from a hydroxyl group but which may contain other substituents, and subsequently eliminating the acyl group from the acyl-diamine component of the final dyestuff.

The new dyestuffs contain six azo groups and are salts of an acid having the following probable formula:

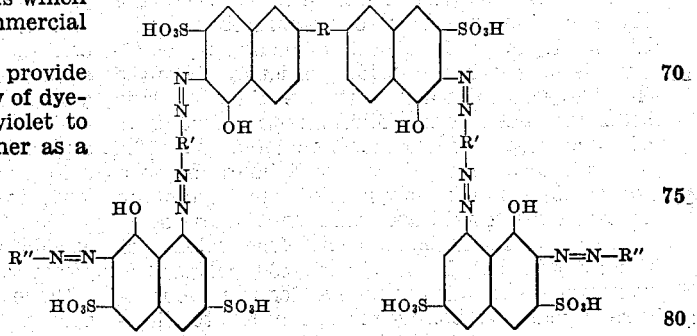

in which R represents the imino group (NH) or the urea group, (NH.CO.NH), R′ denotes an aromatic hydrocarbon nucleus (as for example, a benzene or a naphthalene nucleus) which is free from a hydroxyl group and may contain other groups, more particularly alkyl and alkoxy groups, e. g., $CH_3$, $C_2H_5$, etc., and $OCH_3$, $OC_2H_5$, $OC_3H_7$, $OC_4H_9$, etc. and R″ stands for a hydrocarbon radical of the benzene series which contains an amino group and may contain groups other than a hydroxyl group as an alkyl group and/or a sulfo or a carboxyl group.

In the dried and pulverized state and in the form of their sodium salts, the dyestuffs are dark powders soluble in water and in concentrated sulfuric acid. Cotton from a neutral or alkaline bath is dyed blue to violet shades which upon being developed on the fibre, as for example with beta-naphthol, produce shades of a similar hue which are fast to washing and capable of being discharged with reducing agents to a white.

Among the dyestuffs having the above probable general formula, those comprising I-acid imide and an amino cresol ether as middle components, and a phenylenediamine sulfonic acid as the end component, are particularly important.

As an illustrative embodiment of a manner in which the invention may be practiced, the following example is presented. The parts are by weight.

*Example.*—68.2 parts of the monosodium salt of 1.8-amino-napthol-3.6-disulfonic acid (H-acid) are dissolved in water containing the necessary quantity of sodium carbonate to produce a neutral solution. It is then diazotized in the usual way at 0° C. with 13.8 parts of sodium nitrite and hydrochloric acid and to the resulting diazo solution there is added a solution of 28 parts of cresidine (i. e., 4-methyl-2-amino-1- methoxybenzene) dissolved in dilute hydrochloric acid. Sufficient sodium acetate is gradually added to the well stirred mixture to neutralize the mineral acid present. When the coupling is complete, the reaction mixture, heated to 80° C., is acidulated with hydrochloric acid, common salt is added, the solution is cooled to 50° C., and the precipitated aminoazo dye is filtered off. The aminoazo dye thus obtained is dissolved in water and diazotized with 13.8 parts of sodium nitrite and hydrochloric acid, and the resulting diazo solution is added at 0° C. to 50.5 parts of the sodium salt of 5.5'-dihydroxy-2.2'-dinaphthylamine-7.7'-disulfonic acid (I-acid imide) dissolved in 2000 parts of water and 120 parts of sodium carbonate. The mixture is stirred at 0°-10° C. until the coupling is complete. When complete, the resulting tetrakisazo dye is salted out with common salt and filtered off. It is dissolved in 2000 parts of water containing 80 parts of sodium carbonate. The solution is cooled to 0° C. by the addition of ice, and to the mixture there is added the diazo compound obtained by diazotizing at 0° C. 52 parts of oxalyl-p-phenylene-diamine sulfonic acid, previously dissolved in 1000 parts of water with the aid of caustic soda, with 14 parts of sodium nitrite and 70 parts of concentrated hydrochloric acid (sp. gr. 1.16). The mixture is stirred for 1 to 2 hours, or until the combination is complete, at which point no excess of the tetrakisazo component or the diazo component should be present. The volume of the mixture should be about 7500 parts. 375 parts of caustic soda are then added and the mixture is heated to boiling for 30 minutes to eliminate the oxalyl group by saponification, after which the dyestuff is salted out by addition of common salt, and is filtered off, pressed and dried. The resulting dyestuff is the sodium salt of an acid having the following probable formula:

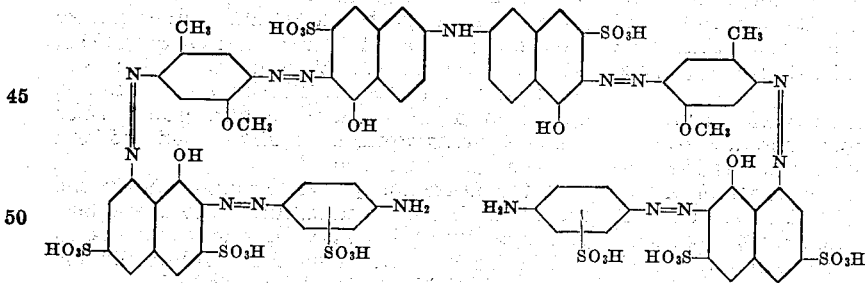

In a dry and pulverized condition in the form of its sodium salt the dyestuff is a grayish black powder soluble in water to give a blue solution, and soluble in concentrated sulfuric acid to give a blue solution which on dilution with water changes to a reddish violet color. It dyes cotton reddish shades of blue which upon development with beta-naphthol becomes greener and brighter. The dyeings show good fastness to washing, to light and to cross dyeing. The dyestuff may be used as a direct or as a developed dye. Upon reduction with stannous chloride and hydrochloric acid it yields two molecules of p-phenylenediamine sulfo acid, two molecules of 1.7-diamino-8-naphthol-3.6-disulfo acid, two molecules of 2-methoxy-4-amino-5-methylaniline and one molecule of 6.6'-diamino-5.5'-dihydroxy-7.7'-disulfo-2.2'-dinaphthylamine.

It will be understood, of course, that the invention is not limited to the particular polyazo dyestuff hereinbefore presented in the formula, nor to the use of the compounds specifically set forth in the example but rather that in its broad aspect it includes polyazo dyestuffs that are produced in an analogous manner through the utilization of other intermediates, as for example, o- and m-anisidines, o- and m-toluidines, 1-amino-2.3-diamethylbenzene, 2-amino-1.3-dimethylbenzene, 2-amino-1.4-dimethylbenzene, 3-methyl-2-amino-1-methoxybenzene, 1-naphthylamine, 1-amino-2-alkoxy (as methoxy, ethoxy, etc.)-naphthalene, etc. in place of cresidine, and/or the formyl, acetyl or oxalyl derivatives of m-phenylenediamine, p-phenylenediamine, 1-methyl-2.4-diaminobenzene, 1-methyl-2.5-diaminobenzene, and their sulfonic and carboxylic acid derivatives in place of p-phenylene-diamine sulfonic acid, and I-acid urea in place of I-acid imide. Of the di-amines the oxalyl-diamines give excellent results, which are considered to be superior to the formyl and the acetyl derivatives.

Since certain changes in carrying out the above process, and certain modifications in the product which embody the invention may be made without departing from its scope, it is intended that all matter contained in the above description shall be interpreted as illustrative and not in a limiting sense.

Having described my invention, what I claim as new and desire to secure by Letters Patent is:

1. As new products, the polyazo dyestuffs having in the form of their acids the following probable formula:

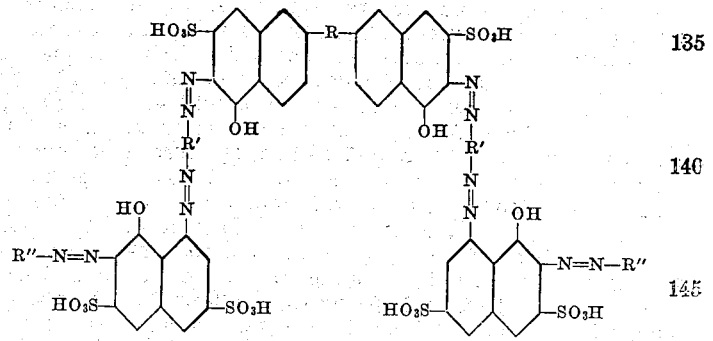

in which R represents NH or HN—CO—NH, R' denotes an aromatic hydrocarbon radical which may contain a nuclear substituent selected from the group consisting of alkyl and alkoxy radicals, and R'' stands for a hydrocarbon radical of the benzene series which contains an amino group as a nuclear substituent and may contain one or more additional nuclear substituents selected from the group consisting of alkyl, sulfo and carboxyl radicals, said dyestuffs, in the form of their sodium salts, dyeing cotton from a neutral of alkaline bath violet to blue shades which on being developed with beta-naphthol give shades of a similar hue which are fast to washing and are capable of being discharged to a white.

2. As new products, the polyazo dyestuffs having in the form of their acids the following probable formula:

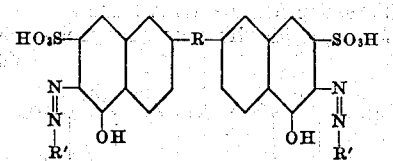

in which R represents NH or HN.CO.NH, V denotes a hydrocarbon radical of the benzene or naphthalene series which may contain a substituent selected from the group consisting of alkyl and alkoxy radicals, and R'' stands for a hydrocarbon radical of the benzene series which contains an amino group as a nuclear substituent and may contain one or more additional nuclear substituents selected from the group consisting of alkyl, sulfo and carboxyl radicals, said dyestuffs, in the form of their sodium salts, dyeing cotton from a neutral or alkaline bath violet to blue shades which on being developed with beta-naphthol give shades of a similar hue which are fast to washing and are capable of being discharged to a white.

3. As new products, the polyazo dyestuffs having in the form of their acids the following probable formula:

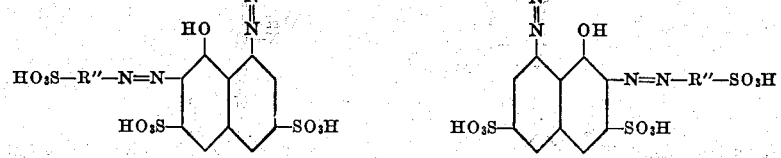

in which R represents NH or HN—CO—NH, R' denotes a hydrocarbon radical of the benzene or naphthalene series which may contain a substituent selected from the group consisting of alkyl and alkoxy radicals, and R'' stands for a hydrocarbon radical of the benzene series which contains an amino group and may contain an alkyl group as nuclear substituents, said dyestuffs, in the form of their sodium salts, dyeing cotton from a neutral or alkaline bath violet to blue shades which are capable of being developed with beta-naphthol to give shades of a similar hue which are fast to washing and are capable of being discharged to a white.

4. As new products, the polyazo dyestuffs having in the form of their acids the following probable formula:

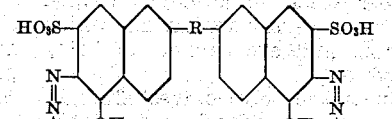

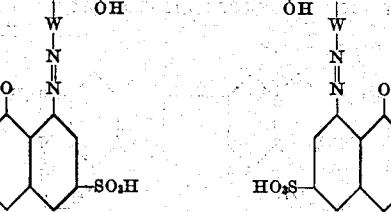

in which R represents NH or HN—CO—NH, W denotes a hydrocarbon radical of the benzene series which may contain one or more substituents selected from the group consisting of alkyl and alkoxy radicals and R'' stands for a hydrocarbon radical of the benzene series which contains an amino group and may contain an alkyl group as nuclear substituents, said dyestuffs, in the form of their sodium salts, dyeing cotton from a neutral or alkaline bath violet to blue shades which are capable of being developed with beta-naphthol to give shades of a similar hue which are fast to washing and are capable of being discharged to a white.

5. As new products, the polyazo dyestuffs having in the form of their acids the following probable formula:

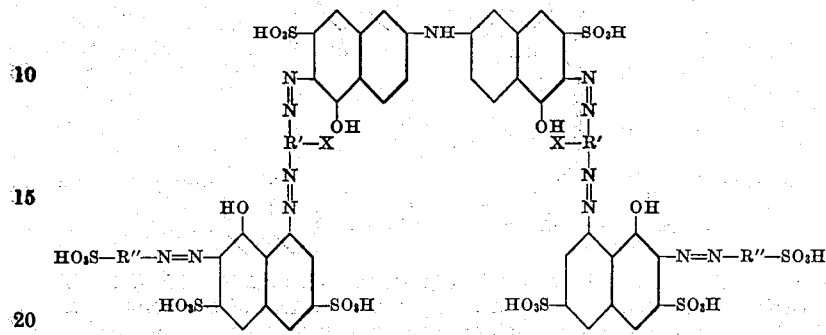

in which X represents a hydrogen atom or an alkoxy group, R' denotes a hydrocarbon radical of the benzene or naphthalene series which may contain an alkyl group as a substituent, and R'' stands for a hydrocarbon radical of the benzene series which contains an amino group and may contain an alkyl group as nuclear substituents, said dyestuffs, in the form of their sodium salts, dyeing cotton from a neutral or alkaline bath violet to blue shades which on development with beta-naphthol give shades of a similar hue which are fast to washing and are capable of being discharged to a white.

6. As new products, the polyazo dyestuffs having in the form of their acids the following probable formula:

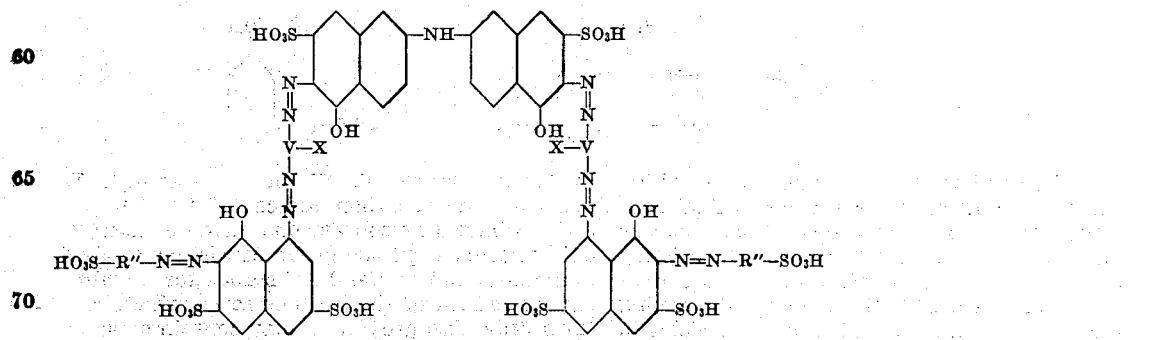

in which V represents a benzene or naphthalene nucleus which is free from a hydroxyl group and may contain an alkyl group, X represents a hydrogen atom or an alkoxy group, and R'' stands for a hydrocarbon radical of the benzene series which contains an amino group and may contain an alkyl group as nuclear substituents, said dyestuffs, in the form of their sodium salts, dyeing cotton from a neutral or alkaline bath violet to blue shades which on development with beta-naphthol gives shades of a similar hue which are fast to washing and are capable of being discharged to a white.

7. As new products, the polyazo dyestuffs having in the form of their acids the following probable formula:

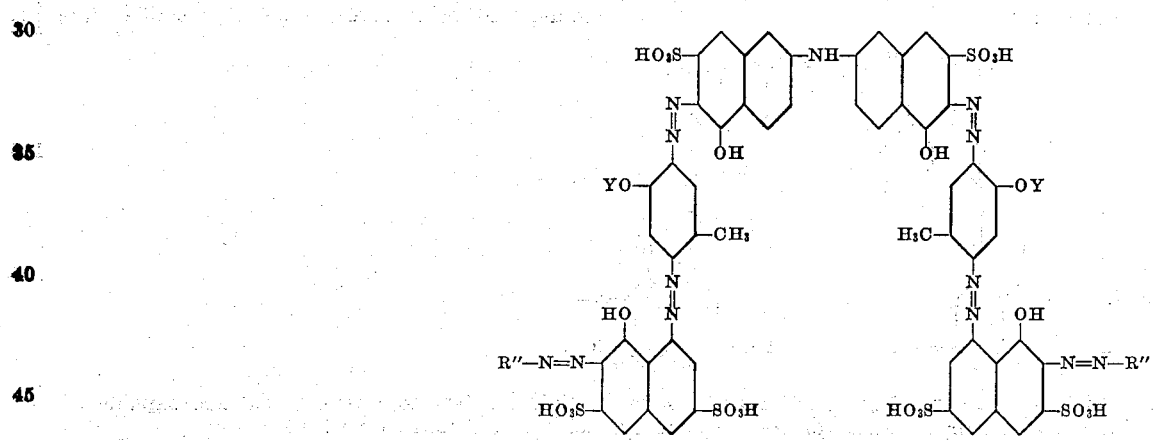

in which Y represents an alkyl group, and R'' stands for a hydrocarbon radical of the benzene series which contains an amino group as a nuclear substituent and may contain one or more additional nuclear substituents selected from the group consisting of alkyl, sulfo and carboxyl radicals, said dyestuffs, in the form of their sodium salts, dyeing cotton from a neutral or alkaline bath violet to blue shades which on development with beta-naphthol give shades of a similar hue which are capable of being discharged to a white.

8. As a new product, the polyazo dyestuff having in the form of an acid the following probable formula:

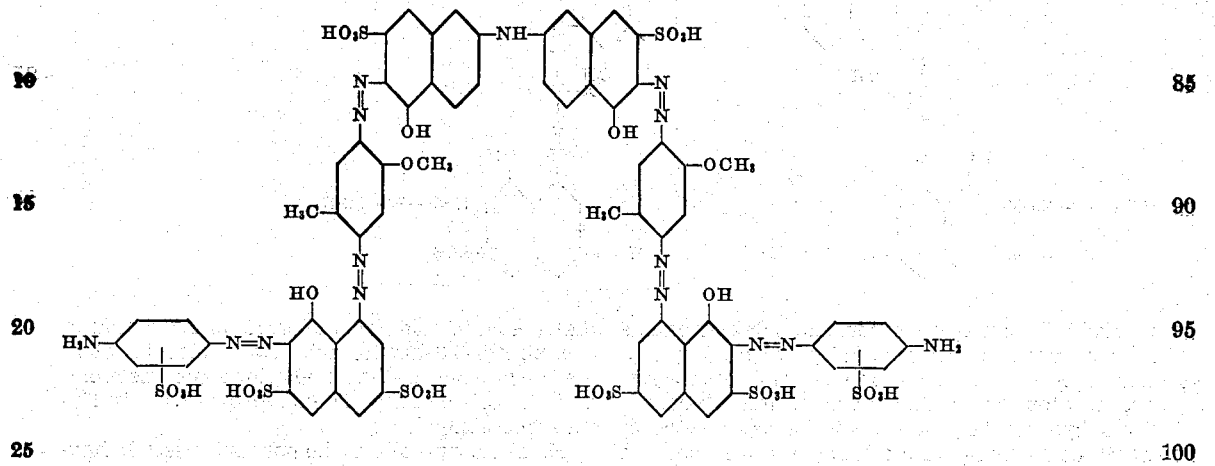

which in a dry and pulverized condition in the form of its sodium salt is a dark powder soluble in water giving a blue solution; dyeing cotton from a neutral or alkaline bath reddish shades of blue which on development with beta-naphthol become greener and faster to washing, and upon reduction with stannous chloride and hydrochloric acid yields two molecules of p-phenylenediamine sulfo acid, two molecules of 1.7-diamino-8-naphthol-3.6 disulfo acid, two molecules of 2-methoxy-4-amino-5-methylaniline and one molecule of 6.6'-diamino-5.5'-dihydroxy-7.7'-disulfo-2.2'-dinaphthylamine.

9. A process for the production of polyazo dyestuffs which comprises coupling a diazotized acyl-diamine of the benzene series with a compound obtained by combining an I-acid compound with a diazotized aminoazo compound prepared from H-acid and an aromatic primary amine of the benzene or naphthalene series which may contain one or more nuclear substituents selected from the group consisting of alkyl and alkoxy radicals.

10. A process for the production of polyazo dyestuffs which comprises coupling two molecular proportions of a diazotized acyl-diamine of the benzene series which is free from a hydroxyl group but may contain other nuclear substituents selected from the group consisting of alkyl, sulfo and carboxyl radicals, with one molecular proportion of a compound obtained by combining one molecular proportion of an I-acid compound with two molecular proportions of a diazotized aminoazo compound prepared by coupling one molecular proportion of diazotized H-acid with one molecular proportion of an aromatic primary amine of the benzene or naphthalene series containing one or more nuclear substituents selected from the group consisting of alkyl and alkoxy radicals.

11. A process for the production of a polyazo dyestuff which comprises coupling oxalyl-p-phenylenediamine sulfonic acid with a tetrakisazo compound obtained by coupling 5.5'-dihydroxy-2.2'-dinaphthylamine-7.7'-disulfonic acid with a diazotized aminoazo compound prepared from 1.8-aminonaphthol-3.6-disulfonic acid with 4-methyl-2-amino-1-methoxy-benzene.

12. As new products, polyazo dyestuffs which in the form of an acid have the following probable formula:

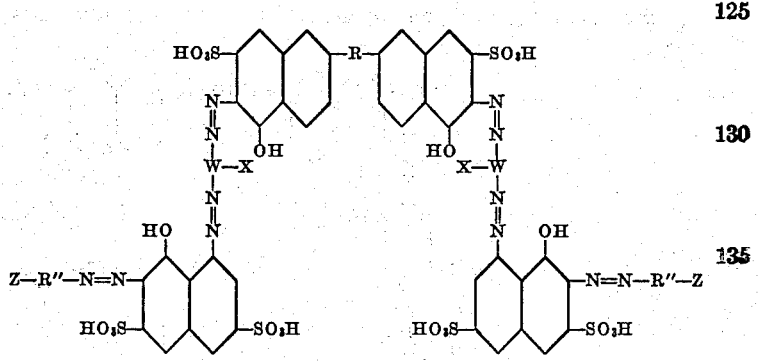

in which R signifies NH, or HN—CO—NH, W denotes a hydrocarbon radical of the benzene series which may contain an alkyl group, X represents a hydrogen atom or an alkoxy group, R'' stands for a hydrocarbon radical of the benzene series which contains an amino group, as a nuclear substituent, and may contain an alkyl group, and Z represents a carboxylic or a sulfonic group.

13. As new products, the polyazo dyestuffs having in the form of their acids the following probable formula:

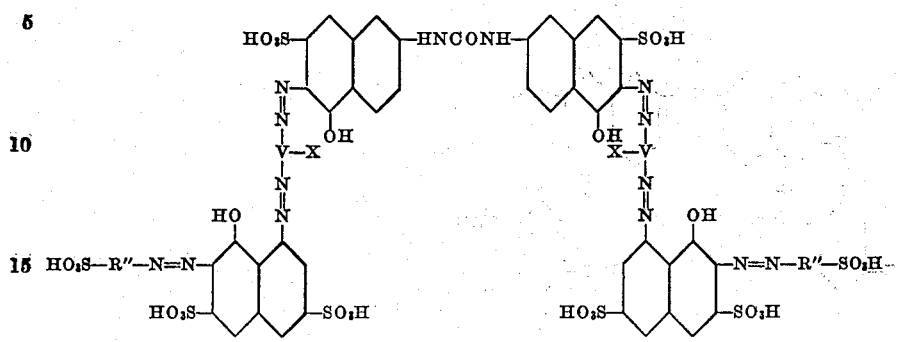

in which V represents a benzene or naphthalene nucleus which is free from a hydroxyl group and may contain an alkyl group, X represents a hydrogen atom or an alkoxy group, and R" stands for a hydrocarbon radical of the benzene series which contains an amino group and may contain an alkyl group as nuclear substituents, said dyestuffs, in the form of their sodium salts, dyeing cotton from a neutral or alkaline bath violet to blue shades which on development with beta-naphthol give shades of a similar hue which are fast to washing and are capable of being discharged to a white.

14. As a new product, the polyazo dyestuff having the following probable formula:

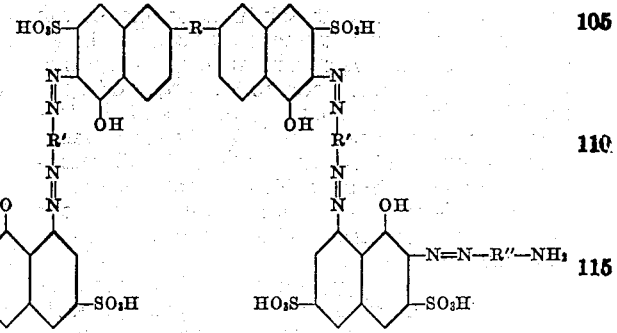

which in a dry and pulverized condition in the form of its sodium salt is a dark powder soluble in water giving a blue solution; dyeing cotton from a neutral or alkaline bath reddish shades of blue which on development with beta-naphthol become greener and faster to washing; and upon reduction with stannous chloride and hydrochloric acid yields two molecules of p-phenylene-diamine sulfo acid, two molecules of 1.7-diamino-8-naphthol-3.6-disulfo acid, two molecules of 2-methoxy-4-amino-5-methylaniline and one molecule of 6.6'-diamino-5.5'-dihydroxy-7.7'-disulfo-2.2'-dinaphthylurea.

15. As new products, the polyazo dyestuffs having in the form of their acids the following probable formula:

in which R represents NH or HNCONH, R' represents an aromatic hydrocarbon radical which may contain a nuclear substituent selected from the group consisting of alkyl and alkoxy radicals, and R" stands for a hydrocarbon radical of the benzene series, said dyestuffs, in the form of their sodium salts, dyeing cotton from a neutral or alkaline bath violet to blue shades which on being developed with beta-naphthol give shades of a similar hue which are fast to washing and are capable of being discharged to a white.

16. As new products, the polyazo dyestuffs having in the form of their acids the following probable formula:

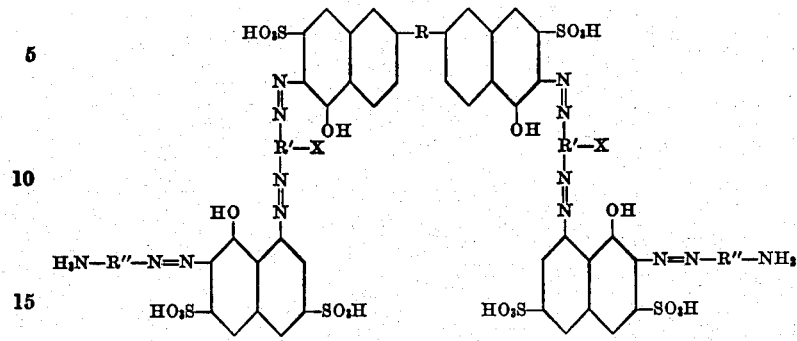

in which R represents NH or HN.CO.NH, R' denotes a hydrocarbon radical of the benzene or naphthalene series, which may contain an alkyl radical as a substituent, X represents a hydrogen atom or an alkoxy radical, and R" stands for a hydrocarbon radical of the benzene series, said dyestuffs, in the form of their sodium salts, dyeing cotton from a neutral or alkaline bath violet to blue shades which on being developed with beta-naphthol give shades of a similar hue which are fast to washing and are capable of being discharged to a white.

18. As a new product, the polyazo dyestuff having in the form of an acid the following probable formula:

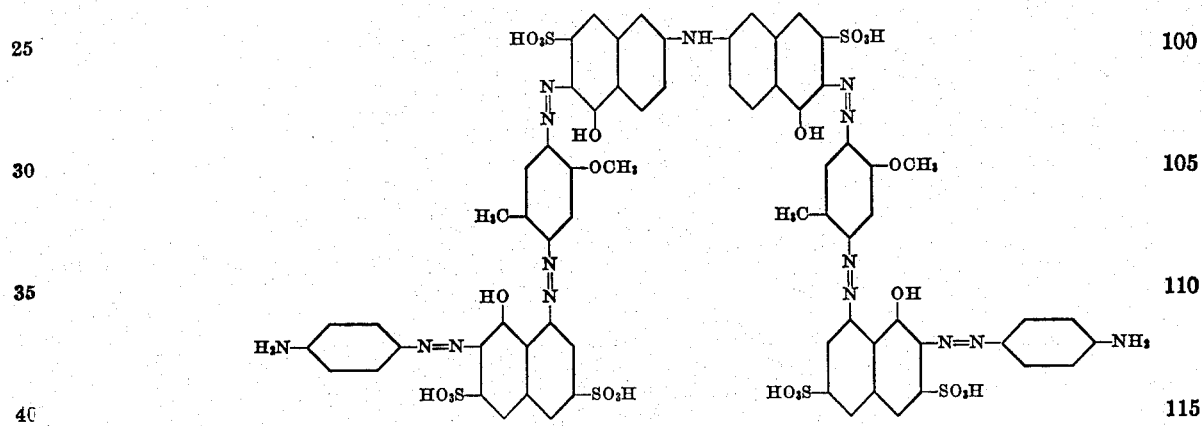

which in a dry and pulverized condition in the form of its sodium salt is a dark powder soluble in water giving a blue solution; dyeing cotton from a neutral or alkaline bath reddish shades of blue which on development with beta-naphthol become greener and faster to washing; and upon reduction with stannous chloride and hydrochloric acid yields two molecules of p-phenylenediamine, two molecules of 1.7-diamino-8-naphthol-3.6-disulfo acid, two molecules of 2-methoxy-4-amino-5-methylaniline and one molecule of 6.6'-diamino-5.5'-dihydroxy-7.7'-disulfo-2.2'-dinaphthylamine.

17. As new products, the polyazo dyestuffs having in the form of their acids the following probable formula:

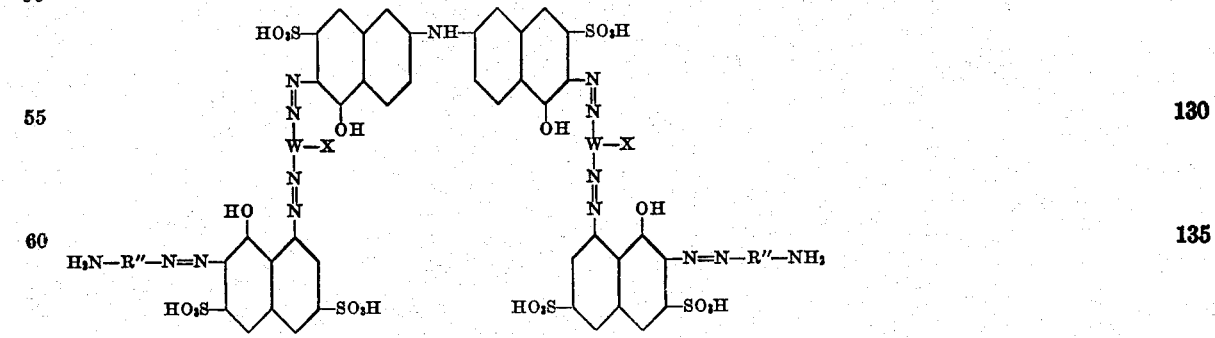

in which W denotes a hydrocarbon radical of the benzene series, X represents a hydrogen atom or an alkoxy radical, and R" stands for a hydrocarbon radical of the benzene series, said dyestuffs, in the form of their sodium salts, dyeing cot-

RALPH B. PAYNE.